US011623310B2

(12) United States Patent
Goncalves

(10) Patent No.: US 11,623,310 B2
(45) Date of Patent: Apr. 11, 2023

(54) INSTALLATION APPARATUS FOR MOUNTING A GARNISH ONTO A VEHICLE STRUCTURE AND METHODS OF MAKING AND USING THE SAME

(71) Applicant: Honda Motor Co., Ltd., Tokyo (JP)

(72) Inventor: Alexander A. Goncalves, Ontario (CA)

(73) Assignee: HONDA MOTOR CO., LTD., Tokyo (JP)

( * ) Notice: Subject to any disclaimer, the term of this patent is extended or adjusted under 35 U.S.C. 154(b) by 802 days.

(21) Appl. No.: 16/553,757

(22) Filed: Aug. 28, 2019

(65) Prior Publication Data

US 2021/0061190 A1   Mar. 4, 2021

(51) Int. Cl.
| | |
|---|---|
| *G01L 5/00* | (2006.01) |
| *B62D 65/02* | (2006.01) |
| *B23P 19/02* | (2006.01) |
| *B60R 13/02* | (2006.01) |

(52) U.S. Cl.
CPC .......... *B23P 19/02* (2013.01); *B60R 13/0206* (2013.01); *B62D 65/026* (2013.01); *G01L 5/0028* (2013.01); *G01L 5/0038* (2013.01); *B60R 2013/0293* (2013.01)

(58) Field of Classification Search
CPC ... G01L 5/0028; G01L 5/0038; B62D 65/026; B62D 65/024; B60R 2013/0293; B25B 27/0028; B25B 27/0035; B25B 27/0092; B25B 27/02; B25B 27/00; B60J 10/45
See application file for complete search history.

(56) References Cited

U.S. PATENT DOCUMENTS

| | | | |
|---|---|---|---|
| 5,065,486 A | 11/1991 | Goedderz | |
| 5,068,952 A | 12/1991 | Hennen | |
| 6,565,117 B2 | 5/2003 | Kubota et al. | |
| 8,146,228 B2 | 4/2012 | Kondo et al. | |
| 8,336,184 B2 | 12/2012 | Yamamoto et al. | |
| 9,776,578 B2 | 10/2017 | Yamamoto | |
| 9,857,456 B2 | 1/2018 | Hara et al. | |
| 9,902,449 B2 * | 2/2018 | MacArthur | .......... B21D 39/023 |
| 2014/0290020 A1 * | 10/2014 | Radhakrishnan | ... B25B 27/0092 |
| | | | 29/252 |

FOREIGN PATENT DOCUMENTS

| | | |
|---|---|---|
| CN | 105158150 A | 12/2015 |
| CN | 206544125 U | 10/2017 |
| DE | 102013002538 A1 | 3/2014 |
| JP | 4928235 B2 | 5/2012 |

* cited by examiner

*Primary Examiner* — Christopher J Besler
(74) *Attorney, Agent, or Firm* — Kenealy Vaidya LLP

(57) ABSTRACT

An installation apparatus for mounting a garnish on a vehicle can include a jig, a tool and a controller. The jig can be placed on a predetermined portion of the flange and in a predetermined orientation relative to the flange. The jig can orient the tool in a predetermined orientation relative to the garnish when the jig is placed on the vehicle and the garnish is positioned adjacent to the vehicle. The controller can be configured to indicate an install complete condition based on force data and tool proximity data, where the force data is indicative of a force applied by the tool onto the garnish while the tool installs the garnish onto the first portion, and the tool proximity data is indicative of a proximity of the tool relative to a portion of the vehicle after the tool mounts the garnish onto the vehicle.

20 Claims, 4 Drawing Sheets

INSTALLATION APPARATUS FOR MOUNTING A GARNISH ONTO A VEHICLE STRUCTURE AND METHODS OF MAKING AND USING THE SAME

BACKGROUND

The disclosed subject matter relates to apparatus and methods for mounting a garnish onto a vehicle structure. More particularly, the disclosed subject matter relates to methods and apparatus that can verify that the garnish is positioned and secured to the vehicle structure in accordance with a desired specification.

Vehicles can include one or more aesthetic members mounted on structure of the vehicle that is located in the passenger compartment of the vehicle. The aesthetic member can have a predetermined coloring and surface texture that can be aesthetically pleasing to an occupant of the vehicle. The aesthetic member can cover or conceal one or more structural portions, component and/or systems of the vehicle from view by the occupant of the vehicle. The aesthetic member can be referred to as a trim panel, a trim piece, a trim garnish or a garnish.

For example, a trim panel can be mounted onto a metal panel of the door to cover the metal panel and conceal from view the window regulator, the door lock mechanism and the electrical wiring in the door, In another example, a pillar garnish can be mounted onto a metal pillar of the vehicle to cover at least a portion of the metal pillar that would otherwise be viewable by an occupant seated inside the vehicle. The pillar garnish can also conceal from view one or more components and/or systems such as but not limited to an electrical wiring harness, an airbag assembly, a seatbelt retractor assembly.

The aesthetic member can be connected to the structural member of the vehicle or to another aesthetic member by any appropriate attachment element such as but not limited to a threaded fastener, a rivet, a plastic clip, a snap fastener, or any combination thereof. The attachment element can be secured to a side of the aesthetic member that is concealed from view by an occupant of the vehicle in any appropriated manner such as but not limited to welding, staking, adhesive, integrally molding with the aesthetic member, insert-molding onto the aesthetic member, or any combination thereof.

SUMMARY

Some embodiments are directed to an installation apparatus for mounting a garnish having at least one attachment element onto a first portion of a vehicle. The vehicle can include a flange adjacent to the first portion. The installation apparatus can include a jig, a tool and a controller. The jig can be configured to be placed on a predetermined portion of the flange and in a predetermined orientation relative to the flange. The tool can be connected to the jig such that the jig orients the tool in a predetermined orientation relative to the garnish when the jig is placed on the predetermined portion of the flange and in the predetermined orientation, and when the garnish is positioned adjacent to the first portion. The controller can be configured to indicate an install complete condition when both of force data corresponds to a predetermined force threshold and tool proximity data corresponds to a predetermined tool proximity threshold, where the force data is indicative of a force applied by the tool onto the garnish while the tool installs the garnish onto the first portion, and the tool proximity data is indicative of a proximity of the tool relative to one of the flange, the first portion, and a second portion of the vehicle after the tool mounts the garnish onto the predetermined portion, where the second portion is adjacent to the first portion, and record the force data, the position data, and a vehicle identification data.

Some embodiments are directed to a method for installing a garnish having at least one attachment element onto a first portion of a vehicle. The vehicle can include a flange adjacent to the first portion. The method can include: arranging each of a tool, a jig, and the garnish such that the jig is on a predetermined portion of the flange and in a predetermined orientation relative to the flange and the garnish is between the tool and the first portion of the vehicle, and such that the attachment element is aligned with a mating structure on the first portion of the vehicle; using the jig to guide the tool while moving the tool relative to the jig and applying a force to the garnish; indicating an install complete signal when both of force data corresponds to a predetermined force threshold and tool proximity data corresponds to a predetermined tool proximity threshold, where the force data is indicative of a force applied by the tool onto the garnish while the tool installs the garnish onto the first portion, and the tool proximity data is indicative of a position of the tool relative to one of the flange, the first portion, and a second portion of the vehicle after the tool mounts the garnish onto the predetermined portion, where the second portion is adjacent to the first portion; and recording the force data, the position data, and a vehicle identification data.

Some embodiments are directed to an installation apparatus for mounting a garnish having at least one attachment element onto a first portion of a pillar of a vehicle. The pillar can include a first flange adjacent to the first portion and a second flange adjacent to the first portion. The vehicle can include a third flange connected to and extending away from the first flange at an angle. The installation apparatus can include a jig, a tool and a controller. The jig can include a first portion configured to abut the first flange and a second portion configured to abut the third flange. The tool can include a handle and a tool head connected to the handle. The tool head can be configured to engage the garnish. The tool can be connected to the jig such that the jig orients the tool head in a predetermined orientation relative to the garnish when the jig abuts the first flange and second flange, and when the garnish is positioned adjacent to the first portion. The tool can be configured to measure force data indicative of a force applied by the tool head to the garnish while the tool installs the garnish onto the first portion. The tool can be configured to measure tool proximity data that is indicative of a proximity of the tool head relative to one of the flange, the first portion, and a second portion of the vehicle after the tool mounts the garnish onto the predetermined portion, where the second portion is adjacent to the first portion. The controller can be configured to indicate an install complete condition when force data corresponds to a predetermined force threshold and tool proximity data corresponds to a predetermined tool proximity threshold, and record the force data, the position data, and a vehicle identification data.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The aesthetic member can be installed by hand. Thus, it can be desirable to confirm that the aesthetic member has been positioned with the desired spacing from the surrounding structure(s) and the attachment element has been secured to the vehicle structure according to the desired specification. It is possible that the orientation of the aesthetic member can make it difficult for a visual and/or a tactile inspection to confirm that the aesthetic member is in the desired position and that the attachment element is secured to the vehicle structure in accordance with the desired specification. Further, tolerances of other vehicle structures adjacent to the aesthetic member can impair or prohibit a visual inspection. Further still, it is possible that some attachment elements can render a tactile inspection ineffective or indeterminate. Alternatively, a tactile inspection can be undesirable for other attachment elements.

Thus, it can be desirable to provide an installation apparatus 10 that confirms that the aesthetic member has been positioned on and secured to the vehicle structure in accordance with the desired specification. The installation apparatus can be configured to provide a repeatable and reliable confirmation of the position of the aesthetic member and the force used to secure the attachment element to the vehicle structure.

Figure 1:
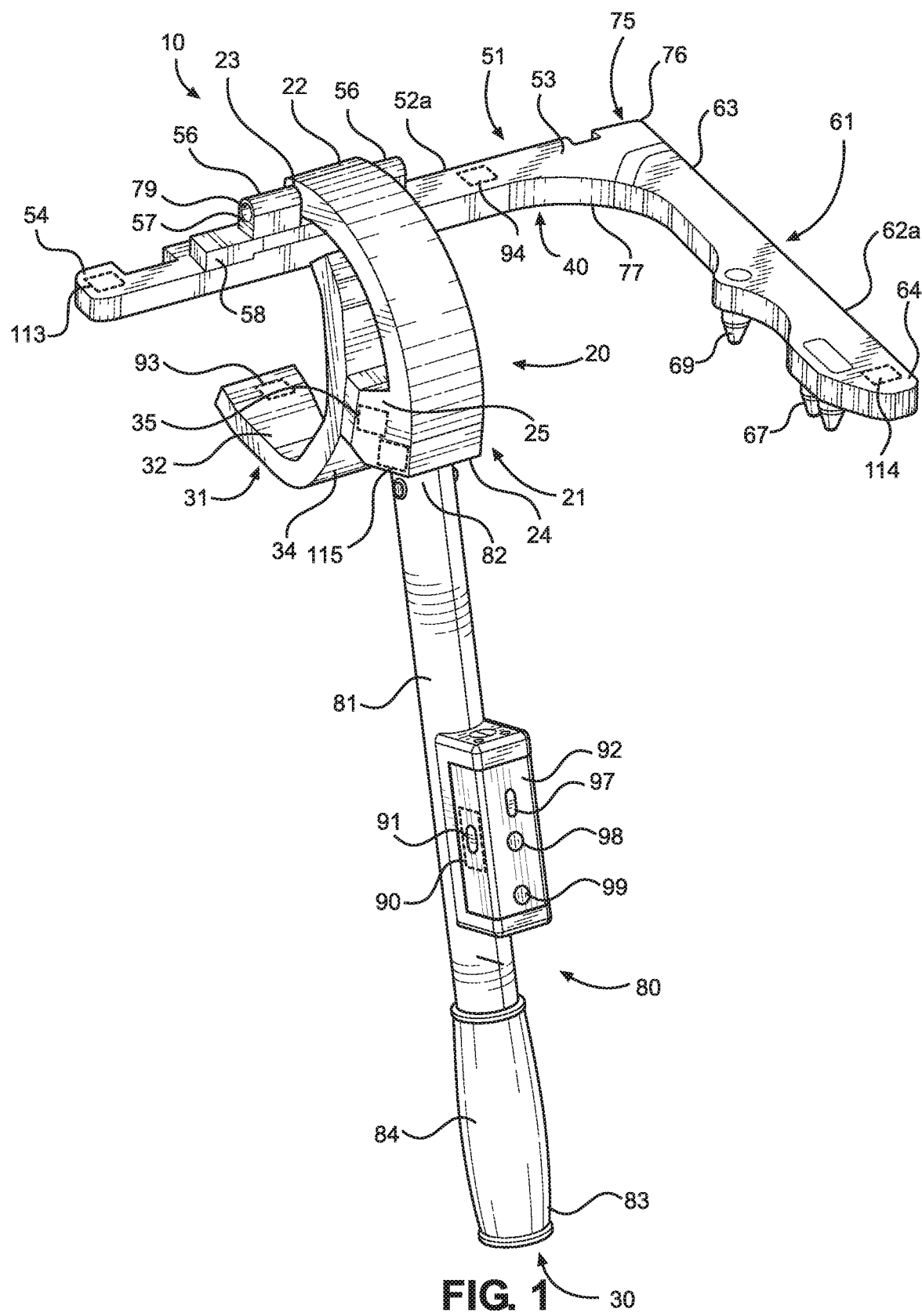
FIG. 1 is a perspective view of an installation apparatus in accordance with principles of the disclosed subject matter.
Figure 2:
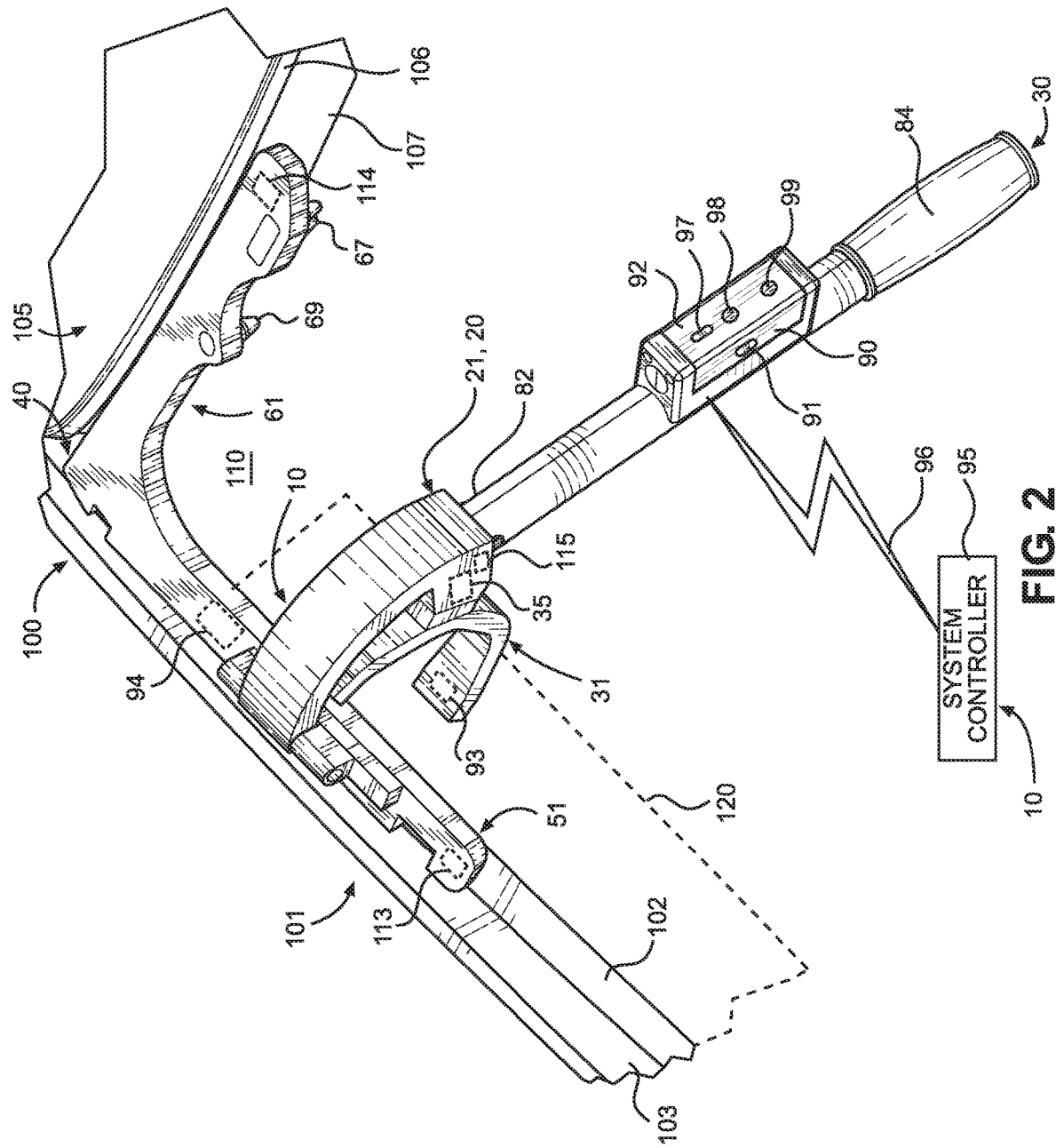
FIG. 2 is a perspective view of the installation apparatus of FIG. 1 in operation in a window opening of a vehicle.
Figure 3:
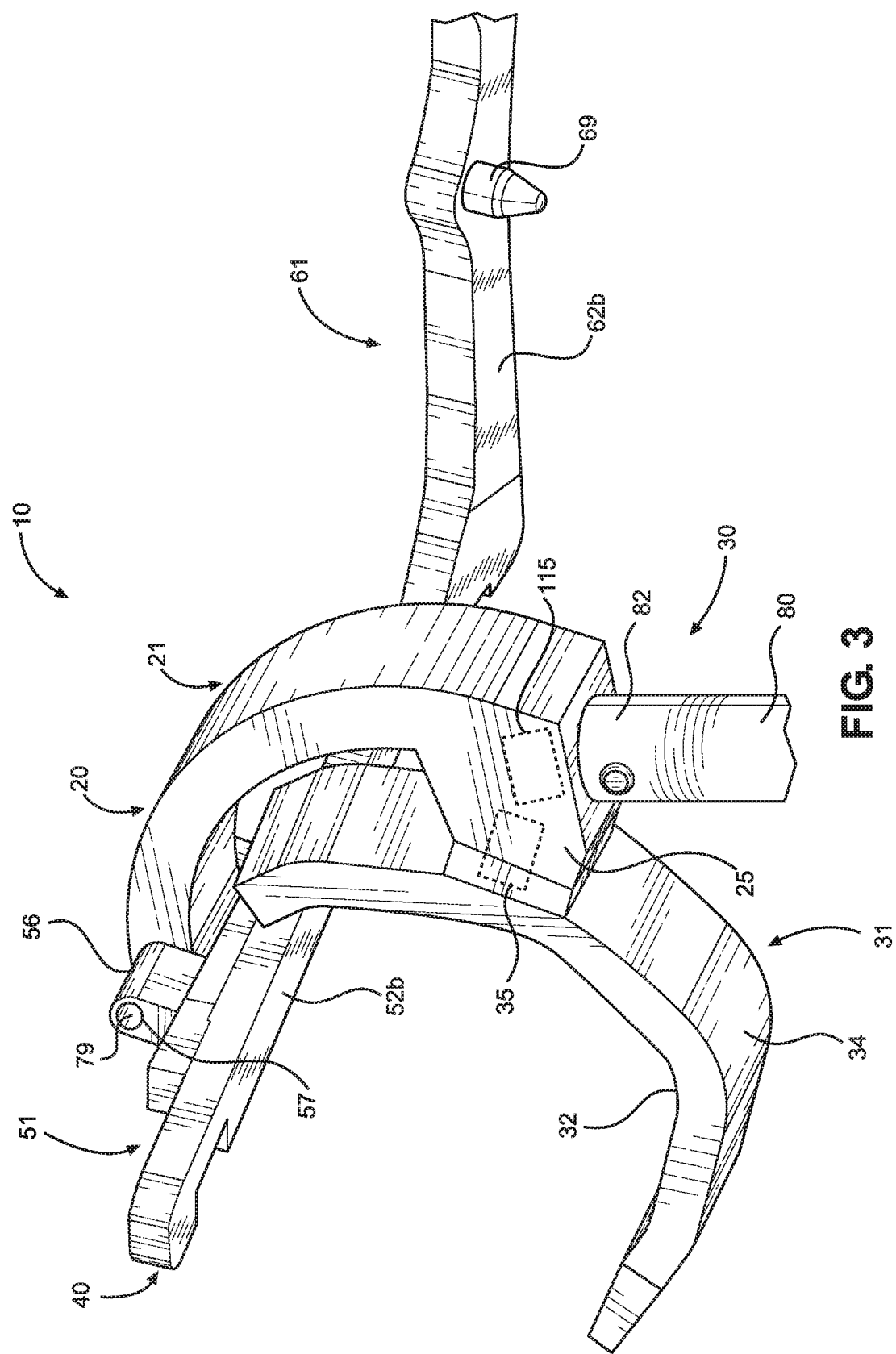
FIG. 3 is a bottom perspective view of a portion of the installation apparatus of FIG. 1.

Referring to FIGS. 1-3, the installation apparatus 10 can include a jig 40 and a tool 30. The jig 40 can be configured to guide an operator to locate the tool 30 relative to a garnish 120. As shown in FIG. 2, installation apparatus 10 can be used to mount a garnish 120 onto a vehicle structure such as a vehicle pillar 101. The tool 30 can be configured to provide a mechanical advantage for the operator to press the garnish 120 and connect the attachment element onto the vehicle pillar 101. The installation apparatus 10 can be configured to verify a desired installation of the garnish 120 has been achieved by checking a final position of the jig 40 relative to the vehicle pillar 101, verify that the attachment element has been connected in accordance with the desired specification by measuring the force applied by the tool 30 onto the garnish 120 during the installation process, and record the force data and the position data acquired during the mounting process along with a vehicle identification data. The installation apparatus 10 can be configured to indicate an install complete signal when the force data corresponds to a predetermined force threshold and the proximity data corresponds to a predetermined proximity threshold, where the proximity data is indicative of a proximity of the tool 30 relative to a predetermined portion of the vehicle structure after the tool 30 mounts the garnish 120 onto the vehicle structure.

Referring to FIG. 1, the tool 30 can include a tool head 20 and a handle 80. The tool head 20 can be movably connected to the jig 40 and configured to engage the garnish 120. The handle 80 can be configured to be grasped by an operator.

The tool head 20 can include a support element 21 and an engagement element 31. The support element 21 can include a first end 22 and a second end 24. The second end 24 can be attached to the handle assembly 80. The first end 22 can be movably connected to the jig 40 in any appropriate manner that can permit the tool 30 to move in a desired manner relative to the jig 40. For example, the tool 30 can be configured to pivot relative to the jig 40. The first end 22 can include a pin aperture 23. The pin aperture 23 can house or contain a pivot pin 79. The pivot pin 79 can be attached to the jig 40 and the support element 22 such that pivot pin 79 is fixed relative to the support member 21 and rotates relative to the jig 40. However, alternate embodiments can include the pivot pin 79 fixed relative to the jig 40 and the support element 21 can be configured to rotate about the pivot pin 79. Accordingly, the tool 30 can be pivotally mounted to the jig 40.

The support element 21 can include a connecting member 25. The connecting member 25 can connect the engagement element 31 to the support element 21. The connecting member 25 can be positioned at or adjacent to the second end 24 of the support element 21. Accordingly, the connecting member 25 can be provided at or proximate a portion of the support element 21 that connects to the handle assembly 80.

The connecting member 25 can house a force sensor 35 that is schematically illustrated in phantom in FIGS. 1-3. The force sensor 35 can be any appropriate sensor that can detect a force applied by the tool 30 to the garnish 120. For example, the force sensor 35 can be any appropriate sensor such as but not limited to a strain gauge, a piezoelectric sensor, a capacitive load cell, a force sensing resistor that can output an electrical signal that is proportional to the force applied to the sensor. As shown in FIG. 1, the installation apparatus 10 can include a controller 90. The controller 90 can be in electrical communication with the force sensor 35. For example, electrical wires can run from the force sensor 35 to the controller 90. Alternatively, the controller 90 could be wirelessly connected to the force sensor 35.

Accordingly, the force sensor 35 can output signals or data that can be processed by the controller 90. The force sensor 35 can output data such that the controller 90 can determine an amount of force being applied by the tool 30 onto the garnish 120.

The engagement element 31 can include a curved or arcuate structure that wraps around or cradles the garnish 120. The engagement element 31 can include an inner curved surface 32. The inner curved surface 32 can receive and support the vehicle garnish 120. The engagement element 31 can also include an outer curved surface 34. The outer curved surface 34 can be of similar curvature to the inner curved surface 32. The curvature of the engagement element 31, including the inner curved surface 32 and the outer curved surface 34, can correspond in shape to that of the garnish 120. Accordingly, the engagement element 31 can include portions of varying curvature or bend(s) that correspond to the particular shape of the garnish 120 to be mounted onto the vehicle.

As shown in FIG. 1, for example, the support element 21 can also include a curved or arcuate structure that is curved about or that wraps about the engagement element 31. of the support element 21 and the engagement element 31 can have any appropriate size, dimension, and curvature that can adequately accommodate the garnish 120 such that the installation apparatus 10 can reliably assess the installed position of the garnish 120 and the force applied to the garnish 120 by the tool 30 during the installation process.

The jig 40 can include a first seating leg 51 and a second seating leg 61. The first seating leg 51 can be elongated in shape and include a first intermediate portion 53. The second seating leg 61 can be elongated in shape and include a second intermediate portion 63. The first intermediate portion 53 can be connected to and attached to the second intermediate portion 63. The first seating leg 51 can be connected to the second seating leg 61 such that the first seating leg 51 is disposed or positioned at substantially right angles to the second seating leg 61. However, the particular angle of attachment of the first seating leg 51 to the second seating leg 61, and other geometry of the jig 40, can be dependent upon particular geometry of the vehicle with which the installation apparatus 10 is to be used.

For example, the installation apparatus 10 may be manufactured to be used to mount a vehicle garnish 120 to a window opening 110, as shown in FIG. 2. The window opening 110 can be defined by a vehicle pillar 101. The vehicle pillar 101 can be referred to as an A-pillar of the vehicle and separate a front door of the vehicle and the windshield of the vehicle. The vehicle pillar 101 can include a first flange 102 and a pillar wall 103.

The window opening 110 can also be defined by a header flange 107 of the vehicle. The header flange 107 can define a front edge or portion of a roof 105 of the vehicle.

Accordingly, the garnish jig 10 can be constructed with a geometry that matches or corresponds to the particular geometry of the vehicle. In some embodiments, the first seating leg 51 and the second seating leg 61 can be perpendicular or substantially perpendicular to each other. For example, substantially perpendicular can be understood to be at an angle that one skilled in the art would perceive as being a perpendicular angle. However, in other embodiments, the first seating leg 51 and the second seating leg 61 can be positioned at any appropriate angle relative to each other in order for the jig 40 to reliably seat on the flanges 102, 107.

The first seating leg 51 can include first engagement surfaces 52a, 52b, as shown in FIG. 1 and FIG. 3. The second seating leg 61 can include second engagement surfaces 62a, 62b. The first engagement surfaces 52a, 52b can include an outer surface 52a and a lower surface 52b of the first seating leg 51. Such first engagement surfaces 52a, 52b can engage with the pillar wall 103 and the first pillar flange 102, respectively, as shown in FIG. 2. The second engagement surfaces 62a, 62b can include an outer surface 62a and a lower surface 62b of the second seating leg 61. Such second engagement surfaces 62a, 62b can engage with a header wall 106 and the header flange 107, respectively, as shown in FIG. 2. Accordingly, the installation apparatus 10 can be seated and supported upon both the first pillar flange 102 and the header flange 107. Additionally, the first seating leg 51 can be constructed so as to correspond with any curvature of the first pillar flange 102 and the pillar wall 103. The second seating leg 61 can be constructed so as to correspond with any curvature of the header wall 106 and the header flange 107.

With further reference to FIG. 1, the first seating leg 51 can include a first leg outer end 54. The second seating leg 61 can include a second leg outer end 64.

The jig 40 can include a connection elbow portion 75. The connection elbow portion 75 can be formed collectively by the first intermediate portion 53 and the second intermediate portion 63. The connection elbow portion can include an outer corner 76 and an inner rounded corner 77. The outer corner 76 can form a right angle, a substantially right angle, or some other angle. The outer corner 76 can be of an angle so as to correspond to a matching angle on the vehicle. For example, the outer corner 76 can correspond to a junction of the first pillar flange 102 and the header flange 107 of the vehicle and the junction of the pillar wall 103 and the header wall 106. The inner rounded corner 77 can be rounded. The geometry of the jig 40 can be constructed so as to provide sufficient structural integrity and obtain reliable support from the flanges 102, 107.

The jig 40 can include hinge barrels 56. The hinge barrels 56 can be supported upon or attached to a support substrate 58. The support substrate 58 can be supported upon or attached to the first seating leg 51.

In some embodiments of the disclosure, the hinge barrels 56 and the support substrate 58 can be considered to be a part of the first seating leg 51. In other embodiments of the disclosure, the hinge barrels 56 and the support substrate 58 can be considered to be mounted upon the first seating leg 51. The hinge barrels 56, support substrate 58, and first seating leg 51 can be integrally formed with each other.

The hinge barrels 56 can be provided on opposed sides of the first end 22 of the support element 21. The hinge barrels 56 can be provided with respective pin apertures 57. The pin apertures 57 of each of the hinge barrels 56 can support opposing ends of the pivot pin 79. The pivot pin 79 can pass through the pin aperture 23 and into the pin apertures 57. Accordingly, the tool 30 can be movably attached to the jig 40.

The installation apparatus 10 can be received or seated into a corner of the vehicle structure formed by the first pillar flange 102, the pillar wall 103, the header wall 106 and the header flange 107. The jig 40 can be provided with features that assist in accurate positioning of the jig 40 relative to a predetermined portion of the vehicle pillar 101. Referring to FIGS. 1 and 2 collectively, the jig 40 can include position pins 67, 69. The position pins 67, 69 can be provided to abut the header flange 107. In alternate embodiments, the position pins 67, 69 can be received into holes or apertures that are provided in the header flange 107. In alternate embodiments, the position pins 67, 69 can be positioned proximate other markers or indicia provided on the header flange 107 such as but not limited to notches or recess in the header flange 107. The position pins 67, 69 can be separated from each other or provided in pairs. The second position pin 69 can be separate from the first position pin 67.

The handle 80 can include a handle body 81 and a grip 84. The grip 84 can be connected to the handle body 81 in any appropriate manner such as but not limited to a friction fit, adhesive, mechanical fasteners, or any combination thereof. The handle body 81 can include an attachment end 82 and a grip end 83. The attachment end 82 can be attached to the tool head 20. Specifically, the attachment end 82 can be attached onto the support element 21 of the tool head 20. The handle 80 can be attached to the tool head 20 by a suitable mechanical arrangement such as welding, brazing, adhesive, mechanical fastener, friction fit, mating threads formed in the support element and on the attachment end 82, or any combination thereof.

The handle 80 can include or support the controller 90. The handle 80 can include a housing 92. The controller 90 can be mounted in the housing 92 in any appropriate manner.

The controller 90 can be in electrical communication with an electric power source. The power source can be one or more batteries mounted within the tool 30. Alternate embodiments of the installation apparatus 10 can include a controller 90 that is electrically connected to an external electrical power source by an electric wire that is connected to and extends away from the tool 30.

The installation apparatus 10 can include a first proximity sensor 93, a second proximity sensor 94, third proximity sensor 113 and a fourth proximity sensor 114. The proximity sensors 93, 94, 113, 114 can be any appropriate sensor such as but not limited to an inductive proximity sensor.

The first proximity sensor 93 can be mounted on adjacent to a lower tip of the engagement element 31. The first proximity sensor 93 can identify when the tool 30 is in a particular position relative to vehicle pillar 101. The first proximity sensor 93 can be configured to output a signal that is indicative of the proximity of the tool 30 to a predetermined portion of the vehicle pillar 101. The predetermined portion of the vehicle pillar 101 can be any appropriate portion of the vehicle pillar 101 such as but not limited to the first pillar flange 102, or a flange on a portion of the vehicle pillar 101 that is obstructed from view in FIG. 2, or a portion of the vehicle pillar 101 that is adjacent to the first pillar flange 102.

The second proximity sensors 94, 113, 114 can be mounted on the jig 40. The second and third proximity sensors 94, 113 can be configured to output a signal that is indicative of the proximity of the jig 40 to a respective predetermined portion of the vehicle pillar 101. The predetermined portions of the vehicle pillar 101 can be any appropriate portions of the vehicle pillar 101 such as but not limited to the first pillar flange 102. The fourth proximity sensor 114 can be mounted on the jig 40. The fourth proximity sensor 114 can be configured to output a signal that is indicative of the proximity of the jig 40 to a predetermined portion of the vehicle such as the header flange 107.

The installation apparatus 10 can include a plurality of indicator lights 91, 97, 98, 99 mounted on the housing 92. The power indicator light 91 can indicate that the controller 90 is connected to and supplied with electrical power from the power source. The jig indicator light 97 can be configured to indicate whether or not the jig 40 has been seated in on the first pillar flange 102. The force indicator light 98 can be configured to indicate whether or not the tool 30 has applied an appropriate force to the garnish 120 so that the attachment element can be reliably considered as being connected to the vehicle pillar 101 in accordance with the desired specification. The proximity indicator light 99 can be configured to indicate whether or not the tool 30 has displaced the garnish 120 toward the vehicle pillar 101 so that the attachment element can be reliably considered as being connected to the vehicle pillar 101 in accordance with the desired specification.

The controller 90 can be configured to determine whether or not the jig 40 is seated on the first pillar flange 102, the tool 30 has applied a desired force to the garnish 120, and the tool 30 has moved the garnish 120 to a desired position relative to a predetermined portion of the vehicle pillar 101 based on data received from each of the sensors 35, 93, 94. The controller 90 can be configured to illuminate the indicator lights 97, 98, 99 based on the data from the sensors 35, 93, 94.

In operation, an operator can place the jig 40 on the flanges 102, 107. Specifically, the operator can place the first seating leg 51 onto the first pillar flange 102. The operator can place the second seating leg 61 onto the header flange 107. The jig 40 can be positioned relative to the vehicle pillar 101 by abutting outer surface 52a against the pillar wall 103, abutting the lower surfaces 52b, 62b against the flanges 102, 107, abutting the positioning pins 67, 69 against the header flange 107.

The proximity sensors 94, 113, 114 can identify one or more relative positions of the vehicle 100. The proximity sensors 94, 113, 114 can be configured to send a data that is indicative of the bottom surfaces 52b, 62b of the jig 40 abutting the flanges 102, 107 when the bottom surfaces 52b, 62b abut the flanges 102, 107. The controller 90 can configured to activate the installation apparatus 10 when the controller determines that the data from the proximity sensors 94, 113, 114 corresponds to a predetermined jig proximity threshold that represents the desired position of the jig 40 abutting on the flanges 102, 107. Such activation can fully turn on or enable the installation apparatus 10 for operation. The installation apparatus 10 can include a system controller 95 that is separate from the controller 90. Such activation can establish communication between the system controller 95 and the controller 90 as shown in FIG. 2. A communication pathway 96 can provide communication between the controller 90 and the system controller 95. The communication pathway 96 can be a wire communication pathway or a wireless communication pathway.

Once activated or otherwise operational, the operator can slide the garnish 120 into position between the vehicle pillar 101 and the jig 40 as shown in FIG. 2. Accordingly, the operator can slide a bottom of the garnish 120 into position in the window opening 110 and can align the attachment element on the garnish 120 with a mating structure of the vehicle pillar 120 such as but limited to a mounting hole.

The operator can then use the tool 30 to apply a force to the garnish 120 until the operator causes the tool 30 to apply a force sufficient to cause the attachment element to connect to the mating structure of the vehicle pillar 101. The force applied can be continuously registered by the force sensor 35. The controller 90 can be configured to process the data that is input from the force sensor 35. The controller 90 can continuously, or at predetermined time intervals, compare the force data to a predetermined force threshold. If the force data corresponds to the predetermined force threshold, the controller 90 can be configured to illuminate the force indicator light 98. The illuminated force indicator light 98 can be a first part of an installation complete signal that can be indicated by the controller 90.

The controller 90 can be configured to analyze the proximity data from the first proximity sensor 93 that corresponds to the proximity of the tool 30 to the vehicle pillar 101 and the force data that corresponds to the predetermined force threshold. The controller 90 can be configured to illuminate the proximity indicator light 99 if the proximity data corresponds to a predetermined tool proximity threshold. The predetermined tool proximity threshold can be representative of the position of the garnish 120 relative to the vehicle pillar 101 where the attachment element can be known to be engaged with the mating structure of the vehicle pillar 101 in the manner desired by the specification. The illuminated proximity indicator light 99 can be a second part of the installation complete signal that can be indicated by the controller 90.

If the controller 90 illuminates the force indicator light 98 and the proximity indicator light 99, the operator can understand that the operator has mounted to the pillar garnish 120 in accordance with the desired specification. Accordingly, the installation apparatus 10 can analyze position data and force data (including maximum force experienced) so as to ensure that the garnish 120 is mounted on the vehicle pillar 101 in accordance with the desired specification. For example, the installation apparatus 10 can communicate to an operator that the maximum force was exceeded during the installation process so that the operator can replace the garnish 120 with a new garnish 120 that has been installed in accordance with the desired specification. The installation apparatus 10 can also analyze a force curve so as to ensure that the garnish 120 is being set properly, i.e. during the process of mounting.

The proper setting of the garnish 120 can be recorded by the controller 90 and/or the system controller 95. The controller 90 and/or the system controller 95 can be configured to record the force data and the proximity data together with a vehicle identification data. The vehicle identification data can include data that can distinguish the vehicle from other vehicles having a respective pillar garnish 120 installed on the respective vehicle pillar 101. Thus, the installation apparatus 10 can permit identification at a later time of the proper vehicle on which the garnish 120 is to be replaced if the installation apparatus 10 determines that the force data and/or the position data does not meet the desired specification.

Figure 4:
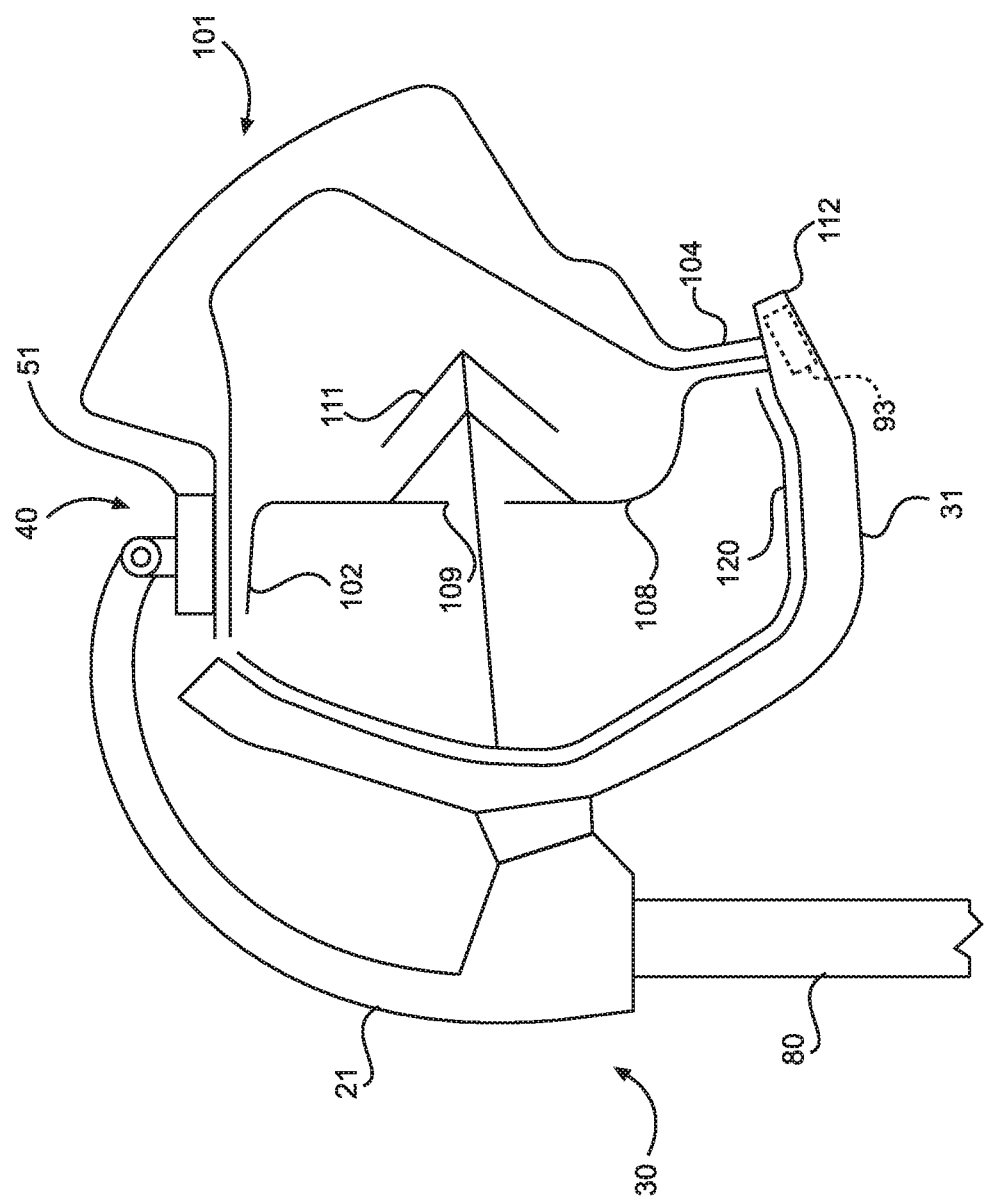
FIG. 4 schematically illustrates the tool and jig of the installation apparatus of FIG. 1 and a cross-section of a vehicle pillar.

FIG. 4 schematically illustrates the tool 30, the jig 40, and an exemplary attachment element 111, and a cross-section of the garnish 120 and the vehicle pillar 101. The vehicle pillar 101 can include a second flange 104, a first portion 108 and a mating structure 109. The first portion 108 can be adjacent to the first pillar flange 102. The second pillar flange 104 can be adjacent to the first portion 108. The tool 80 can be used to apply a force onto the garnish 120 that pushes the attachment element 111 into the mating structure 109 such that the garnish 120 is located in a final desired position and the attachment element 111 is in a fully engaged position with respect to the first portion 108 of the vehicle pillar 101. FIG. 4 shows the garnish 120 in the final desired position and the attachment element 111 in the fully engaged position.

The mating structure 111 can be any appropriate structure that can physically engage the attachment element 111. For example, the mating structure 111 can be a hole in the first portion 108 of the vehicle pillar 101 that is smaller than a first portion of the attachment element 111 and larger than a second portion of the attachment element 111.

A tip 112 of the engagement element 31 can be adjacent to a second flange 104 of the vehicle pillar 101 when tool 30 abuts the garnish 120 is in the final desired position. The first proximity sensor 93 can output proximity data to the controller 90 and/or the system controller 95 that corresponds to the predetermined proximity threshold when the engagement element 31 abuts the garnish 120 and the garnish 120 is in the final desired position.

Accordingly, an operator can install a garnish having at least one attachment element onto a first portion of a vehicle by using the installation apparatus 10. Specifically, the installation apparatus 10 can assist the operator in arranging each of the tool 30, the jig 40, and the garnish 120 such that the jig 30 is on a predetermined portion of the first pillar flange 102 and in a predetermined orientation relative to the first pillar flange 102 and the garnish 120 is between the tool 30 and the first portion 108 of the vehicle 100, and such that the attachment element 111 is aligned with the mating structure 109 on the first portion 108 of the vehicle 100. Further, the operator can use the jig 40 to guide the tool 30 while moving the tool 30 relative to the jig 40 and applying a force to the garnish 120. The controller 90 and/or the system controller 95 can provide an indication to the operator that the operator has installed the garnish 120 and the attachment element in the desired final position with respect to the pillar 101 and the mating structure 109.

The combination of sensors 93, 94, 113, 114 can reduce or avoid the number of false positives to be issued by the installation apparatus 10. For example, a proper setting of a vehicle garnish 120 may require that both (1) a proper force and/or force curve based on the force data from the force sensor 35 and analyzed by the controller 90 in mounting of the vehicle garnish 120, and (2) the proximity sensors 93, 94, 113, 114 sensed proper positioning of the tool 30 relative to the vehicle pillar 101 and proper positioning if the jig 40 relative to the first pillar flange 102 and the header flange 107 during mounting of the garnish 120.

For example, a weld burr or other obstruction might block the attachment element 111 of the garnish 120 from being completely inserted into the desired position with respect to the mating structure 109, but the force data can correspond to the predetermined force threshold. In this exemplary case, the installation apparatus 10 can indicate to the operator that the garnish 120 is not installed in accordance with the desired specification. In another example, an attachment element that is undersized could lead to the proximity sensor 93 showing the attachment element is set, however, the force data could indicate that the force applied by the tool 30 onto the garnish 120 did not correspond to the predetermined force threshold. The installation apparatus 10 can indicate to the operator that the garnish 120 has not been installed in accordance with the desired specification. However, since the installation device 10 can use a combination of sensors, such deficiencies can be identified or avoided.

The controller 90 and/or the system controller 95 can track or record a variety of data relating to operation of the garnish jig 10. For example, the system controller 95 can receive data from the controller 90 so as to record the force data. The force data can include a single force value that corresponds to the force that caused the tool 30 to place the attachment element 111 in the desired final position with respect to the mating structure. Alternate embodiments can record force data that includes a plurality of force values that are detected by the force sensor 35 during the installation process. Such data can be recorded along with identification data such as but not limited to a vehicle identification number (VIN).

The controller 90 and/or the system controller 95 can be configured to record a a hold indicator with the force data, the position data, and the vehicle identification data when either of the force data does not correspond to the predetermined force threshold and the position data does not correspond to the predetermined tool proximity threshold.

As shown in FIG. 2, the jig 40 can be positioned on a left, upper corner of the window opening 110. The jig 40 as shown in FIG. 2 can be reversed for use on an opposite side of the vehicle. For example, the support substrate 58 together with the tool 30 can be removably connected to the first seating leg 51 and subsequently disconnect. The jig 40 can then be flipped so as to conform to the right upper corner of the widow opening 110. The support substrate 58 and the tool 30 can then be reconnected with the jig 40 by reconnecting the support substrate 58 to the first seating leg 51 of the jig 40.

Processing is described herein as being performed by the controller 90. Processing is also described herein as being performed by the system controller 95. It should be appreciated that processing may be distributed over various components including the system controller 95 and the controller 90. Accordingly, for example, processing described herein as being performed by the controller 90 could indeed be shared between the system controller 95 and the controller 90, as well as shared with other processing components.

The tool 30 can include a connection between the tool head 20 and the handle 80 that can permit the handle 80 to pivot relative to the tool head 20. This relative motion can provide the input to the force sensor 35.

A position sensor 115 can be mounted on the tool 30 such that the sensor can provide data indicative of the relative pivotal motion of the handle 80. This sensor data can be useful in determining whether or not the garnish attachment element 111 has been placed in the fully engaged position. For example, the installation apparatus 10 can be configured to use data from the position sensor 115 to determine how far the tool 30 displaced the garnish 120 during the time period that the force sensor 35 measures a resistance force. The position sensor 115 can be any appropriate sensor such as but not limited to a rotary encoder. FIGS. 1-3 schematically illustrate the position sensor 115.

Each of the predetermined force threshold and the predetermined proximity thresholds can be a single predetermined value or a range of predetermined values.

While certain embodiments of the invention are described above, it should be understood that the invention can be embodied and configured in many different ways without departing from the spirit and scope of the disclosed embodiments.

The installation apparatus 10 is described above with reference to a garnish 120 that is mounted on an A-pillar of the vehicle. However, the installation apparatus can be used to mount any aesthetic member to an appropriate structure of the vehicle. Accordingly, installation apparatus can be used in different application and constructed of different geometry that matches with the particular geometry of the vehicle structure and the aesthetic member.

In alternate embodiments, the sensors 35, 93, 94, 113, 114 can be provided on any appropriate portion(s) of the tool 30 and the jig 40. Different types of position sensors or proximity sensors can be utilized in order to achieve the desired force data and proximity data. The proximity sensors can be provided at a location so as to be effective in identifying a desired part or portion of the vehicle.

Exemplary embodiments can include any appropriate number of the proximity sensors 94, 113, 114 to obtain data indicative of a desired location of the jig 40 on the first and second parts of the vehicle. For example, one or both of the proximity sensors 113, 114 could be omitted if the second proximity sensor 94 is configured to provide data indicative of a desired location of the jig 40 on the vehicle.

Alternative embodiments can include the hinge barrels 56, support substrate 58, and first seating leg 51 formed as separate pieces and attached together. For example, the hinge barrels 56 and the support substrate 58 can be integrated together from separate pieces are integrally molded as a single piece and mounted onto the first seating leg 51 in a permanent manner or in a removable manner.

Alternate embodiments can replace the pivot pin 79 and the pin apertures 23 with cylindrical projections formed on the first end 22 of the tool head 20 that are received into respective pin apertures 57 in the hinge barrels 56. Further, alternate embodiments can replace the pivot pin 79 and the pin apertures 57 with cylindrical projections formed on the hinge barrels 56 that are received into respective pin aperture formed in the first end 22 of the tool head 20.

The controller 90 and the sensors 35, can be supplied with power from a battery or a plurality of battery cells housed within the tool 30.

Features, elements and/or characteristics described with respect to one embodiment of the disclosure may be variously used with other embodiments of the disclosure as may be desired.

Various components of embodiments of the disclosure can be made from any of a variety of materials including, for example, steel, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized.

What is claimed is:

1. An installation apparatus for mounting a garnish having at least one attachment element onto a first portion of a vehicle, the vehicle including a flange adjacent to the first portion, the installation apparatus comprising:
   a jig configured to be placed on a predetermined portion of the flange and in a predetermined orientation relative to the flange; and
   a tool connected to the jig, the tool includes a handle and a tool head connected to the handle; and
   a controller configured to,
      indicate an install complete condition when both of force data corresponds to a predetermined force threshold and tool proximity data corresponds to a predetermined tool proximity threshold, where
      the force data is indicative of a force applied by the tool onto the garnish while the tool installs the garnish onto the first portion, and
      the tool proximity data is indicative of a proximity of the tool relative to one of the flange, the first portion, and a second portion of the vehicle after the tool mounts the garnish onto the predetermined portion, where the second portion is adjacent to the first portion, and
      record the force data, the tool proximity data, and a vehicle identification data.

2. The installation apparatus according to claim 1, wherein the tool is connected to the jig such that the tool is movable relative to the jig and the garnish in a predetermined direction when the jig is placed on the predetermined portion of the flange and in the predetermined orientation, and when the garnish is positioned adjacent to the first portion.

3. The installation apparatus according to claim 1, wherein
   the jig includes a surface configured to abut the predetermined portion of the flange and a sensor configured to output jig proximity data indicative of a proximity of the jig relative to the flange, and
   the controller is configured to compare the jig proximity data to a predetermined jig proximity threshold, and the predetermined jig proximity threshold is indicative of a position of the jig when the surface of the jig abuts the predetermined portion of the flange.

4. The installation apparatus according claim 1, wherein the tool includes a sensor mounted in the tool head,
   the tool head is configured to abut the garnish and apply the force to the garnish,
   the sensor is configured to output the tool proximity data, the tool proximity data is indicative the proximity of the tool head relative to one of the flange, the first portion, and the second portion, and the controller is configured to compare the tool proximity data to the predetermined tool proximity threshold, and the predetermined tool proximity threshold is indicative of a position of the attachment element in a fully engaged position on the first portion.

5. The installation apparatus according to claim 1, wherein the tool includes a housing and the controller is mounted in the housing;

the housing includes a force indicator light and a proximity indicator light in electrical communication with the controller, the controller is configured to indicate the install complete condition by illuminating the force indicator light when the force data corresponds to the predetermined force threshold and illuminating the proximity indicator light when the tool proximity data corresponds to the predetermined tool proximity threshold.

6. The installation apparatus according to claim 1, wherein the jig includes a first seating leg and a second seating leg that extends away from the first seating leg at an angle, and the tool is movably connected to the first seating leg.

7. The installation apparatus according to claim 6, wherein the second seating leg is configured to abut a third portion of the vehicle that is connected to and extends away from the flange.

8. The installation apparatus according to claim 1, wherein the jig includes at least one position pin that is configured to engage one of the flange and a third portion of the vehicle that extends away from the first portion.

9. The installation apparatus according to claim 1, wherein the tool is connected to the jig such that the tool pivots relative to the jig.

10. The installation apparatus according to claim 1, wherein the tool includes, a support element extending from and connect to each of the handle and the jig, and an engagement element connected to and extending away from the support element, and the engagement element includes a surface configured to abut the garnish.

11. The installation apparatus according to claim 1, wherein the tool includes, a force sensor configured to generate and output the force data, a proximity sensor configured to generate and output the tool proximity data, and a second controller in electrical communication with each of the controller, the force sensor, and the proximity sensor, the controller is spaced away from the tool, and one of the controller and the second controller is configured to, compare the force data to the predetermined force threshold, output a first force signal when the force data corresponds to the predetermined force threshold, output a second force signal when the force data does not correspond to the predetermined force threshold, output a first tool proximity signal when the tool proximity data corresponds to the predetermined tool proximity threshold, and output a second tool proximity signal when the tool proximity data does not correspond to the predetermined tool proximity threshold.

12. The installation apparatus according to claim 11, wherein the second controller is configured to output each of the first force signal, the second force signal, the first tool proximity signal, and the second tool proximity signal to the controller.

13. The installation apparatus according to claim 11, wherein the second controller is mounted on the tool and is in wireless electrical communication with the controller.

14. A method for installing a garnish having at least one attachment element onto a first portion of a vehicle, the vehicle including a flange adjacent to the first portion, the method comprising:

arranging each of a tool, a jig, and the garnish such that the jig is on a predetermined portion of the flange and in a predetermined orientation relative to the flange and the garnish is between the tool and the first portion of the vehicle, and such that the attachment element is aligned with a mating structure on the first portion of the vehicle;

using the jig to guide the tool while moving the tool relative to the jig and applying a force to the garnish;

indicating an install complete signal when both of force data corresponds to a predetermined force threshold and tool proximity data corresponds to a predetermined tool proximity threshold, where the force data is indicative of a force applied by the tool onto the garnish while the tool installs the garnish onto the first portion, and the tool proximity data is indicative of a position of the tool relative to one of the flange, the first portion, and a second portion of the vehicle after the tool mounts the garnish onto the predetermined portion, where the second portion is adjacent to the first portion; and recording the force data, the tool proximity data, and a vehicle identification data.

15. The method according to claim 14, wherein arranging each of the tool, the jig and the garnish includes, placing the jig onto the predetermined portion of the flange and in the predetermined orientation relative to the flange; and placing the garnish between the tool and first portion of a vehicle after the jig is placed on the on the flange.

16. The method according to claim 14, wherein arranging each of the tool, the jig and the garnish includes, providing the jig with a first a first seating leg and a second seating leg that extends away from the first seating leg at an angle, movably connecting the tool to the first seating leg, placing the first seating leg on the flange, and placing the second seating leg on a second flange that is connected to and extends away from the flange.

17. The method according to claim 14, wherein using the jig to guide the tool includes connecting the tool to the jig such that the tool is pivotable relative to jig and the garnish in a predetermined direction.

18. The method according to claim 14, further comprising:

recording a hold indicator with the force data, the position data, and the vehicle identification data when either of the force data does not correspond to the predetermined force threshold and the position data does not correspond to the predetermined tool proximity threshold.

19. An installation apparatus for mounting a garnish having at least one attachment element onto a first portion of a pillar of a vehicle, the pillar includes a first flange adjacent to the first portion and a second flange adjacent to the first portion, the vehicle includes a third flange connected to and extending away from the first flange at an angle, the installation apparatus comprising:
- a jig including a first portion configured to abut the first flange and a second portion configured to abut the third flange;
- a tool including a handle and a tool head connected to the handle, the tool head is configured to engage the garnish, the tool is connected to the jig, the tool is configured to measure force data indicative of a force applied by the tool head to the garnish while the tool installs the garnish onto the first portion; and the tool is configured to measure tool proximity data that is indicative of a proximity of the tool head relative to one of the first flange, the second flange, the first portion, and a second portion of the vehicle after the tool mounts the garnish onto the predetermined portion, where the second portion is adjacent to the first portion; and
- a controller configured to,
  - indicate an install complete condition when the force data corresponds to a predetermined force threshold and the tool proximity data corresponds to a predetermined tool proximity threshold, and
  - record the force data, the tool proximity data, and a vehicle identification data.

20. The installation apparatus according to claim 19, wherein the controller is mounted on the tool.

* * * * *